United States Patent [19]
Okada et al.

[11] Patent Number: 5,593,002
[45] Date of Patent: Jan. 14, 1997

[54] POWER STEERING SYSTEM EQUIPPED WITH MEANS FOR VARYING AN ASSIST TORQUE THEREOF

[75] Inventors: Yuichi Okada; Toshihiko Aoyama, both of Saitama-ken, Japan

[73] Assignee: Honda Giken Kogyo Kabushiki Kaisha, Tokyo, Japan

[21] Appl. No.: 304,282

[22] Filed: Sep. 12, 1994

[30] Foreign Application Priority Data

Oct. 26, 1993 [JP] Japan ..................... 5-288830

[51] Int. Cl.⁶ ..................... B62D 5/083; B62D 6/00
[52] U.S. Cl. ..................... 180/421; 180/427; 180/428; 180/429; 91/375 A
[58] Field of Search ..................... 180/132, 141, 180/143, 146, 147, 148, 149, 154, 160, 421, 427, 428, 429; 91/375 A, 458, 467, 371

[56] References Cited

U.S. PATENT DOCUMENTS

| | | | |
|---|---|---|---|
| 4,570,736 | 2/1986 | Waldorf | 180/143 |
| 4,601,358 | 7/1986 | Kozuka et al. | 180/143 X |
| 4,637,484 | 1/1987 | Ijiri et al. | 180/148 X |
| 4,678,052 | 7/1987 | Suzuki et al. | 180/143 |
| 4,730,687 | 3/1988 | Chikuma et al. | 180/143 |
| 4,742,883 | 5/1988 | Duffy | 180/148 |
| 4,765,428 | 8/1988 | Kawakami et al. | 180/143 |
| 4,858,713 | 8/1989 | Kawakami et al. | 180/143 |
| 4,860,635 | 8/1989 | Uchida et al. | 180/143 X |
| 4,905,784 | 3/1990 | Yamashita | 180/143 |
| 5,048,630 | 9/1991 | Schaffer | 180/143 X |
| 5,069,301 | 12/1991 | Adams | 180/143 |
| 5,224,564 | 7/1993 | Duffy | 180/142 X |
| 5,293,954 | 3/1994 | Dymond | 180/143 X |
| 5,439,070 | 8/1995 | Haga et al. | 180/149 X |

FOREIGN PATENT DOCUMENTS 60-229871  11/1985  Japan .

*Primary Examiner*—Brian L. Johnson
*Assistant Examiner*—F. Zeender
*Attorney, Agent, or Firm*—Weiner, Carrier & Burt, P.C.; Joseph P. Carrier; Irving M. Weiner

[57] ABSTRACT

The hydraulic power steering system comprises a rotary valve unit actuated according to a twisting angle provided in a torsion bar connected between an input shaft and a pinion, and a conversion mechanism which can change the condition of the rotary valve unit for a given twisting angle of the torsion bar. A variable ratio lever mechanism may be used for this purpose. Thus, a torsion bar having a suitable rigidity can be used without causing any insufficiency in the assisting torque because the responsiveness of the steering system can be freely varied by changing the setting of the conversion mechanism. For instance, it is possible to provide a sufficient assist torque at low speed and a controlled responsiveness at high speed.

12 Claims, 4 Drawing Sheets

POWER STEERING SYSTEM EQUIPPED WITH MEANS FOR VARYING AN ASSIST TORQUE THEREOF

TECHNICAL FIELD

The present invention relates to a power steering system, and in particular to a hydraulic power steering system including a rotary valve unit which is actuated according to a relative twisting angle between a steering wheel shaft and a pinion, and provided with means for varying an assist torque produced by the power steering system for a given steering effort.

BACKGROUND OF THE INVENTION

Various forms of power steering systems are known. A typical hydraulic power steering system is disclosed in Japanese patent laid open (kokai) publication No. 60-229871. According to this known power steering system, a pinion connected to a steering wheel meshes with a rack, and a power cylinder is connected to the rack. The hydraulic pressure supplied to the power cylinder is controlled according to the reaction acting on the steering wheel.

This steering system includes, as an essential component, a rotary valve unit which can vary a cross sectional area of an oil passage defined between an input shaft and an annular valve element fitted on the input shaft according to the relative twisting angle between the input shaft and the valve element caused by the reaction from the road surface to the steering effort applied to the steering wheel. The rotary valve also supplies hydraulic pressure to either one of the two chambers of the power cylinder depending on the direction of the steering effort. Thus, the rotary valve supplies an appropriate hydraulic pressure to a selected one of the two chambers of the power cylinder according to the direction and the magnitude of the steering effort.

The steering wheel and the pinion are connected by a torsion bar pinion shaft to produce the relative twisting angle between them according to the applied steering effort. The twisting rigidity of this pinion shaft is known to strongly affect the handling of the vehicle, and an optimum value of the twisting rigidity depends on the vehicle speed, the steering angle and the steering angular speed. For instance, when the rigidity of the torsion bar is high, a larger steering effort is required for producing a given twisting angle, and the responsiveness of the rotary valve drops. This condition is undesirable when the vehicle speed is low and a greater assisting torque is required. Conversely, when the rigidity of the torsion bar is low, the responsiveness of the rotary valve increases, but this condition is not desirable when the vehicle is travelling at high speed, and a small steering angle causes a pronounced yaw movement of the vehicle.

To overcome this problem, the above mentioned conventional hydraulic steering system is provided with means for applying an opposing torque to the steering wheel shaft which increases with the increase in the travelling speed of the vehicle so that the vehicle operator may encounter a progressively greater steering reaction in turning the steering wheel as the vehicle speed increases. However, according to this solution to the problem, an artificial resistance to the steering effort is created, and the vehicle operator is prevented from getting information on the road condition and the handling of the vehicle which is transmitted to the steering wheel in the form of steering reaction.

BRIEF SUMMARY OF THE INVENTION

In view of such problems of the prior art, a primary object of the present invention is to provide a hydraulic power steering system which can reduce the effort required for steering without causing any excessive responsiveness in the behavior of the vehicle.

A second object of the present invention is to provide a hydraulic power steering system which can provide an adequate assist for the steering action without preventing the reaction from the road surface from being transmitted to the steering wheel.

A third object of the present invention is to provide a hydraulic power steering system which can change the magnitude of power assist according to the vehicle speed without changing the impression of the rigidity or firmness of the steering system as perceived by the vehicle operator.

A fourth object of the present invention is to provide a simple and reliable hydraulic power steering system which can vary its assist torque in dependence on the vehicle speed.

According to the present invention, these and other objects can be accomplished by providing a hydraulic power steering system, comprising: a housing; an input shaft rotatably supported by the housing and adapted to be connected to a steering wheel for receiving a steering input; a pinion rotatably supported by the housing and meshing with a steering rack for actuating steerable road wheels; a torsion bar connected between the input shaft and the pinion in a torque transmitting relationship; a power cylinder for actuating the steering rack; a rotary valve unit adapted to be actuated according to a relative angular displacement between the input shaft and the pinion, the rotary valve unit comprising an annular outer valve element fixedly secured to the pinion coaxially with the torsion bar, and an annular inner valve element rotatably and coaxially received in the outer valve element, the relative angular displacement between the inner and outer valve elements determining the allocation of hydraulic pressure from an oil pump to two pressure chambers of the power cylinder; a conversion mechanism engaged to the input shaft, the inner valve element and the outer valve element for determining relative angular displacements thereof for a given twisting angle of the torsion bar; and varying means for varying the relative angular displacements of the input shaft, the inner valve element and the outer valve element for a given twisting angle of the torsion bar.

Thus, a torsion bar having a suitable rigidity can be used without causing any insufficiency in the assisting torque because the responsiveness of the steering system can be freely varied by changing the setting of the conversion mechanism with the varying means. For instance, it is possible to provide a sufficient assist torque at low speed and a controlled responsiveness at high speed.

According to a preferred embodiment, the conversion mechanism comprises a first member integrally rotatable with the outer valve element and freely slidable along a central axial line of the torsion bar, a second member fixedly secured to the inner valve element, a third member located between the first and second members along an axial direction substantially corresponding to said central axial line and fixedly secured to the input shaft, and a lever member pivotally connected to the first, second and third members in such a manner that the first, second and third members are allowed to move circumferentially relative to one another, and the first member is allowed to move along the axial direction relative to the second member, and the varying means comprises an actuator for moving the first member in the axial direction relative to the second member. Typically, the first, second and third members consist of annular members arranged coaxially around the central axial line, and the lever member consists of a rod member passed through the first, second and third members via spherical joints.

Thus, the conversion mechanism may consist of a highly simple structure which adds very little to the conventional rotary valve unit in terms of complexity and space requirement.

It is important in terms of cost and reliability that the entire system is controlled strictly hydraulically. It can be accomplished by using a hydraulic control cylinder for moving the first member along the axial direction, and by incorporating a vehicle speed sensor unit to the steering system for producing a hydraulic pressure corresponding to a vehicle speed, and applying it to the hydraulic control cylinder.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
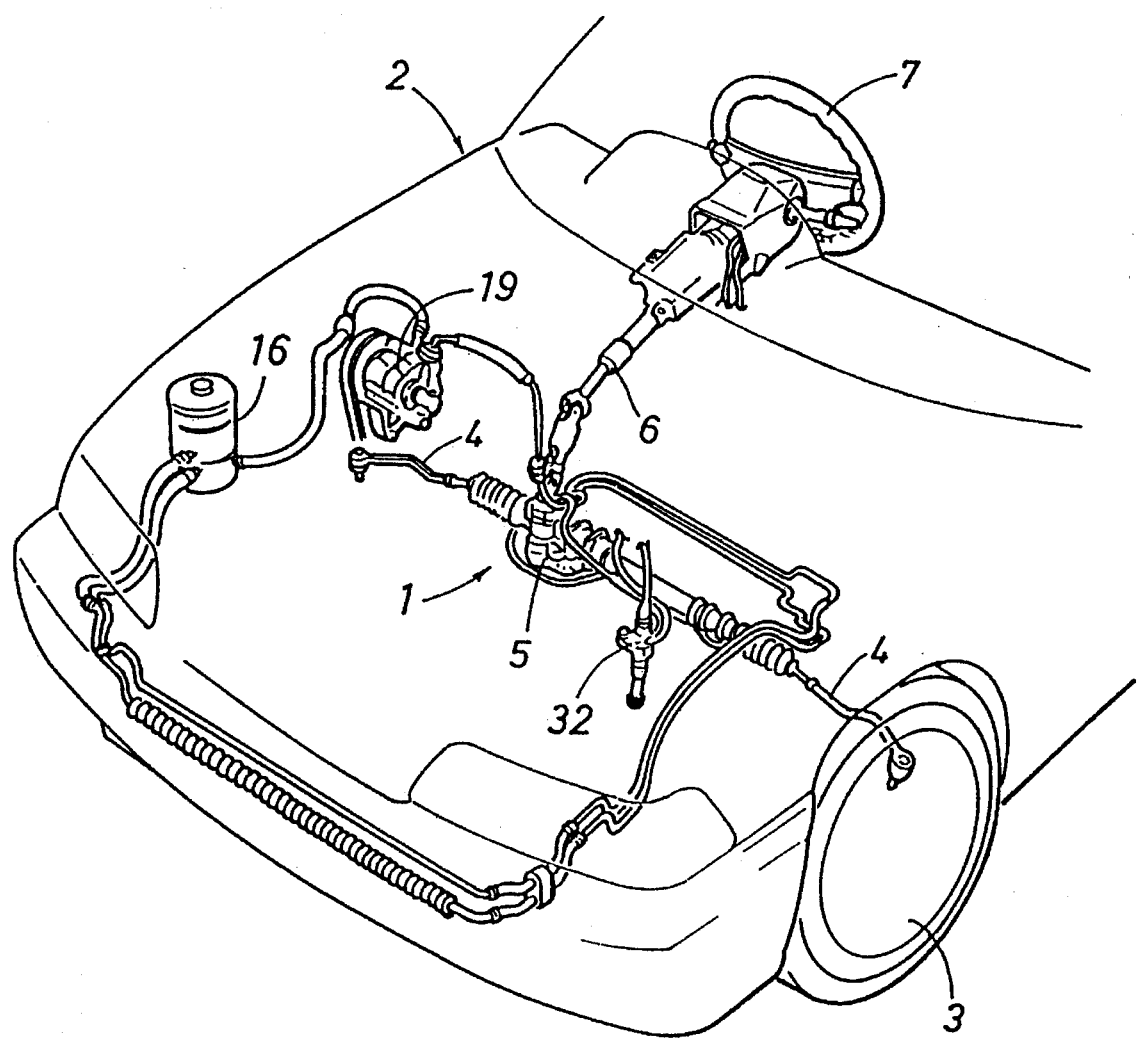
FIG. 1 is a perspective view of an essential part of a vehicle incorporated with an embodiment of the hydraulic power steering system according to the present invention.

Referring to FIG. 1 illustrating the general structure of a hydraulic power steering system 1 according to the present invention, the front wheels 3 of a vehicle 2 are connected to a steering wheel 7 via a pair of tie rods 4, a rack and pinion type steering gear box 5, and a steering shaft 6.

Figure 2:
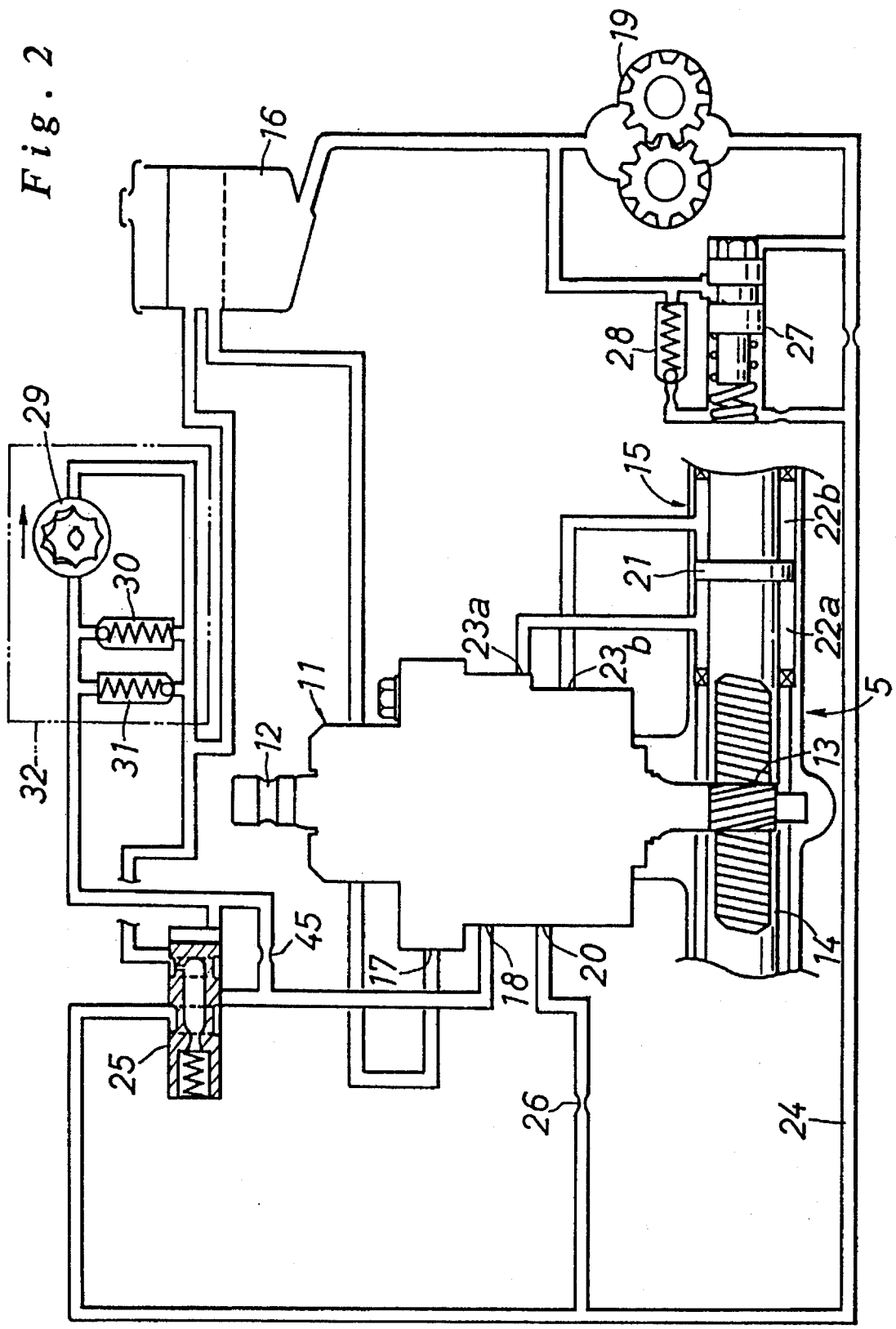
FIG. 2 is a hydraulic circuit diagram of the power steering system according to an embodiment of the present invention.

Referring to FIG. 2, the steering gear box 5 comprises a rotary valve unit 11 for controlling the flow of hydraulic oil, an input shaft 12 connected to the steering shaft 6, a pinion 13, and a steering rack 14 meshing with the pinion 13. The steering rack 14 is integrally incorporated with a double-acting hydraulic power cylinder 15 for producing an assisting axial force.

Figure 3:
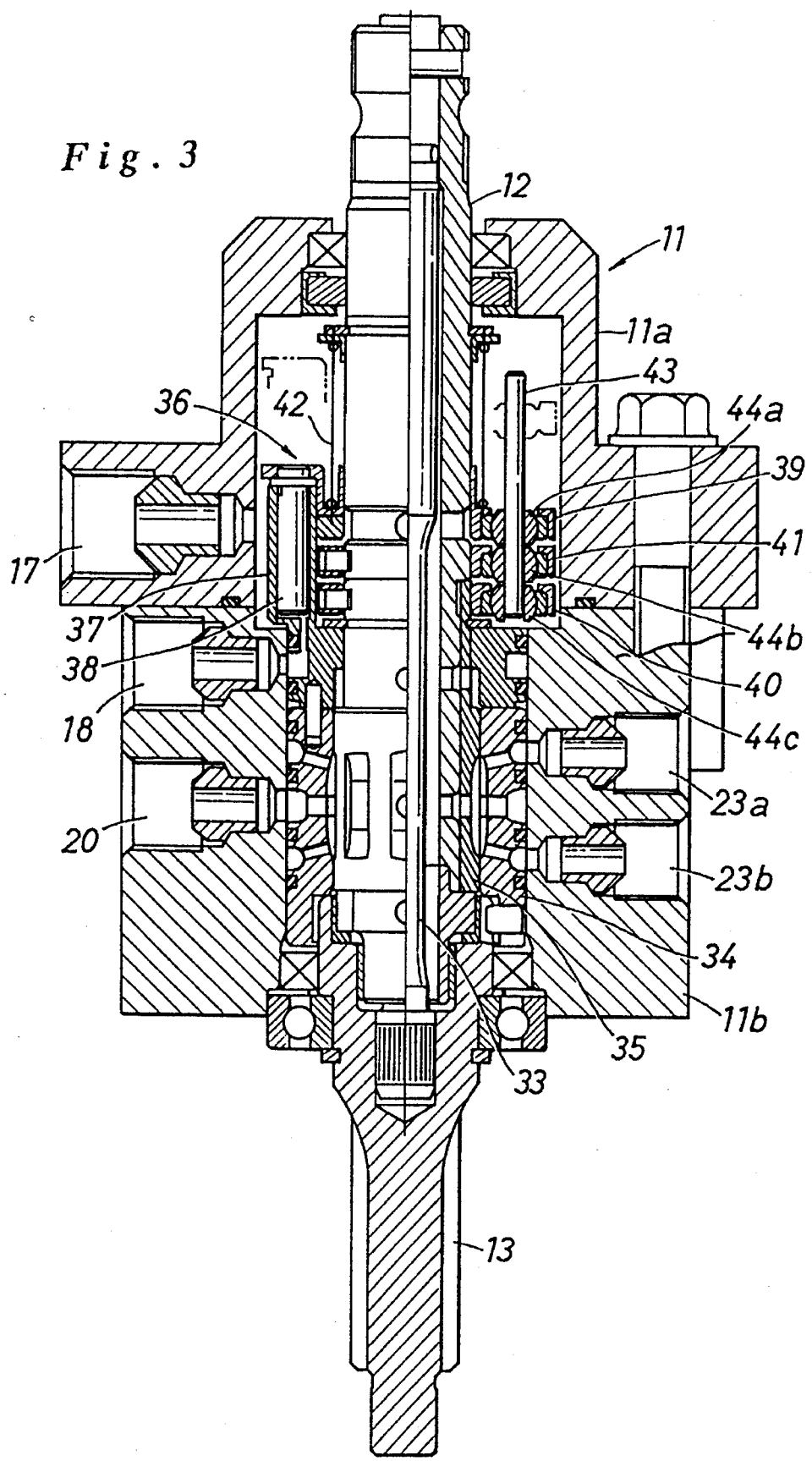
FIG. 3 is a longitudinal section view of the rotary valve unit according to an embodiment of the invention.

Two halves 11a and 11b of the housing of the rotary valve unit 11 are integrally joined together by threaded bolts as illustrated in FIG. 3, and the lower half 11b of the housing is securely attached to the steering gear box 5 although it is not shown in the drawings. The rotary valve unit 11 further comprises a return port 17 for returning the hydraulic oil to an oil tank 16, a control port 18 for receiving a control oil pressure indicating the vehicle speed, a feed port 20 for receiving hydraulic oil directly from the outlet of an oil pump 19, and a pair of cylinder ports 23a and 23b for selectively supplying hydraulic oil to two chambers 22a and 22b separated by a piston 21 in the power cylinder 15.

A main oil passage 24 for feeding hydraulic oil drawn from the oil tank 16 to various parts of the steering system with the oil pump 19 is branched off two branch passages; one of the branch passages is connected to the control port 18 via a cut-off valve 25, and the other branch passage is connected to the feed port 20 via a main orifice 26. A flow control valve 27 and a relief valve 28 are connected in parallel with the oil pump 19 so that the flow rate of the output from the oil pump 19 and the oil pressure in the main oil passage 24 may be kept within certain ranges at all times.

The control port 18 and the cut-off valve 25 are connected to a vehicle speed sensor unit 32 comprising a trochoid control oil pump 29 which is actuated by a speedometer drive gear meshing with a differential gear of the vehicle to produce an output indicating the vehicle speed, a relief valve 30 and a one-way valve 31. When the engine is started but the vehicle is still stationary, because the control oil pump 29 is not actuated, the oil flow through the cut-off valve 25 is interrupted. However, when the vehicle starts moving, the control oil pump 29 is actuated, and draws hydraulic oil from the right end of the valve element of the cut-off valve 25 and delivers it to the oil tank 16 at a flow rate which increases with the increase in the vehicle speed. The one-way valve 31 prevents the inlet end of the vehicle speed sensor unit 32 from becoming negative in pressure even when the vehicle speed is so high that the flow rate of the hydraulic fluid circulating the vehicle speed sensor unit 32 becomes excessive. The relief valve 30 releases the pressure produced from the control oil pump 29 when the vehicle moves backward, and the control oil pump 29 is actuated in the reverse direction. The inlet end of the control oil pump 29 is connected to the oil passage leading to the control port 18 via a sensor orifice 45.

As best shown in FIG. 3, the rotary valve unit 11 is incorporated with the input shaft 12 connected to the steering shaft 6, the pinion 13, a torsion bar 33 connecting the input shaft 12 to the pinion 13, and outer and inner valves 34 and 35 for controlling the mode of communication of the oil passages between the main oil pump 19 and the power cylinder 15.

The input shaft 12 consists of a hollow shaft coaxially receiving the torsion bar 33 therein, and they are joined by a radial pin at their upper ends as seen in FIG. 3. The lower end of the torsion bar 33 is fitted into a central recess provided in the upper end of the pinion 13 via a spline coupling. The annular inner valve element 35 is rotatably fitted on the outer circumferential surface of the input shaft 12, and the annular outer valve element 34 is again rotatably fitted on the outer circumferential surface of the inner valve element 35. The outer valve element 34 is integrally coupled to the pinion 13 which is in turn rotatably supported by the steering gear box 5.

Oil passages are defined in the interface between the outer valve element 34 and the inner valve element 35 similar to those defined in the interface between the input shaft and the valve element of the rotary valve unit of the conventional power steering system, and the relative angular position of these two valve elements 34 and 35 determines the mode of communication of the oil passages between the oil pump 19 and the power cylinder 15.

The upper half 11a of the rotary valve unit housing accommodates therein a conversion mechanism 36 for converting the twisting deformation of the torsion bar 33 into relative circumferential angular displacements of the input shaft 12, the outer valve element 34 and the inner valve element 35. The conversion mechanism 36 comprises a cylinder unit 37, a control piston 38 slidably received in the cylinder unit 37, a first collar 39 fixedly secured to an upper end of the control piston 38 and fitted on the input shaft 12 in both rotatable and axially slidable manners, a second collar 40 fixedly secured to an upper end of the inner valve element 35, a third collar 41 fixedly secured to the input shaft 12 between the first and second collars 39 and 40, a compression coil spring 42 surrounding the input shaft 12 for downwardly biasing the first collar 39, and a transmission rod 43 functionally connecting the first, second and third collars 39, 40 and 41.

Spherical bearings 44a, 44b and 44c are mounted in outer portions of the first, second and third collars 39, 40 and 41, respectively, which align with one another when the steering system is in a neutral position, and the transmission rod 43 is passed or extends through these spherical bearings. The transmission rod 43 is securely press fitted into the spherical bearing 44c of the second collar 40, but are received by the other spherical bearings 44a and 44b in axially slidable manner.

Although one cylinder unit 37 and a single set of spherical bearings 44a, 44b and 44c are illustrated in the drawings, and it can certainly serve the purpose, a plurality, for instance three, of such combinations may be used in the present invention to ensure stable and reliable movement of the three collars 39, 40 and 41.

Now the mode of operation of the above described embodiment is described in the following.

When the engine is not started, and no oil pressure is produced from the main oil pump 19, the cut-off valve 25 is opened up by the spring force of its internal spring, and the oil passage between the oil pump 19 and the control port 18 is in communication.

When the engine is started but the vehicle is still stationary, oil pressure is present in the main oil passage 24 between the oil pump 19 and the cut-off valve 25. Because the oil pump 29 of the vehicle speed sensor unit 32 is not actuated, the oil passage between the sensor orifice 45 and the oil tank 16 is closed. Therefore, the control oil pressure acts on the right end of the valve element of the cut-off valve 25 as seen in FIG. 2, and this valve element is moved to the left, thereby closing the oil passage leading to the control port 18 from the main oil passage 24. In this condition, the oil pressure acting on the right end of the valve element of the cut-off valve 25 is sealed off, and continues to be present as long as the vehicle remains stationary.

Figure 4A:
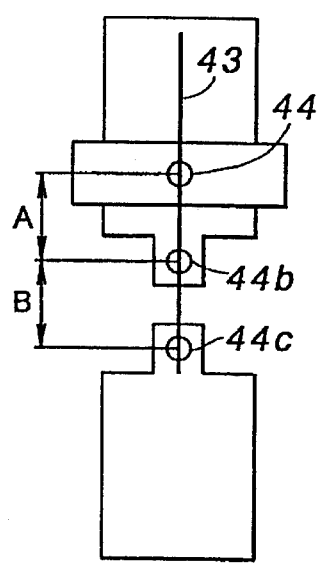
FIGS. 4a through 4c are diagrams illustrating the working principle of the present invention.

At this point, because the oil pressure acting on the control piston 38 is so low that the first collar 39 is at its lowermost position as shown by the solid lines in FIG. 3 under the spring force of the compression coil spring 42. Therefore, the intervals A and B between adjacent spherical bearings 44a, 44b and 44c are equal to each other as illustrated in FIG. 4a (A=B).

Figure 4B:
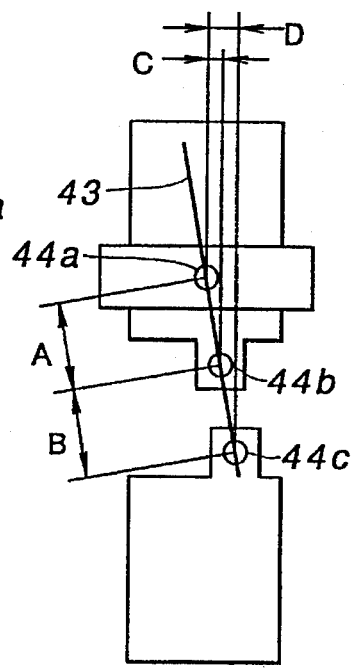
Figure 4C:
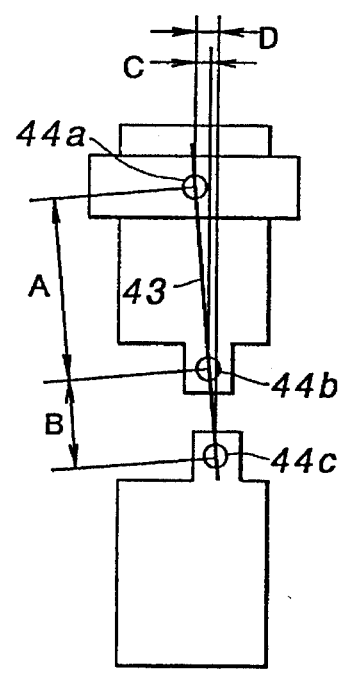

When the steering wheel 7 is turned, the reaction from the road surface acting on the front wheels 3 causes the torsion bar 33 to be twisted, and a certain relative circumferential angular displacement is produced between the input shaft 12 and the outer valve element 34. Because the input shaft 12 turns integrally with the third collar 41 and the outer valve element 34 turns integrally with the first collar 39, a certain relative angular displacement is produced between the third collar 41 and the first collar 39. As a result, the transmission rod 43 is caused to tilt (or twist around the central axial line of the input shaft 12), and the inner valve element 35 is caused to turn integrally with the second collar 40 according to a magnification factor determined by the intervals A and B between adjacent collars 39, 40 and 41 as illustrated in FIG. 4b.

In this case, the relative angular displacement D between the outer valve element 34 and the inner valve element 35 is approximately twice the twisting angle C of the torsion bar 33.

Thus, when the steering wheel 7 is turned counter clockwise against the reaction from the road surface, the oil passage in the interface between the outer valve element 34 and the inner valve element 35 leading to the left chamber 22a of the power cylinder 15 is widened while the oil passage leading to the right chamber 22b of the power cylinder 15 is narrowed. As a result, the flow rate of the hydraulic oil from the main oil pump 19 to the left chamber 22a increases while the oil passage communicating the right chamber 22b to the oil tank 16 is widened. Thus, the pressure in the left chamber 22a becomes dominant, and provides a leftward thrust to the steering rack 14, thereby reducing the effort required for turning the steering wheel 7.

When the steering wheel 7 is turned clockwise, the direction of the relative angular displacement between the outer valve element 34 and the inner valve element 35 is reversed, and the steering rack 14 receives a rightward thrust.

When the vehicle is travelling at high speed, and the steering wheel 7 is subjected to a comparatively small reaction from the road surface, because the control oil pump 29 of the vehicle speed sensor unit 32 is actuated at high speed, the flow rate of the hydraulic oil drawn from the cut-off valve 25 and delivered to the oil tank 16 by the oil pump 29 increases. As a result, the pressure acting on the right end of the valve element of the cut-off valve 25 diminishes, and the valve element is moved rightward by the spring force of the spring incorporated in the cut-off valve 25. This in turn causes the oil passage leading to the control port 18 from the main oil passage 24 to be opened up, and the control piston 38 is pushed upward against the spring force of the compression coil spring 42. The first collar 39 is therefore moved away from the third collar 41, and the intervals A and B between adjacent collars become uneven (A>B).

If the torsion bar 33 is subjected to a twisting torque, and a certain relative angular displacement is produced between the input shaft 12 and the outer valve element 34, the resulting inclination of the transmission rod 43 is smaller than in the previous case, and the degree of the reduction in the inclination of the transmission rod 43 is determined by the lever ratio of the transmission rod 43 with its fulcrum placed on the third collar 42. In other words, the relative angular displacement D between the outer valve element 34 and the inner valve element 35 is smaller for a given twisting angle C of the torsion bar as compared to the previous case. The reduction in the relative angular displacement between the outer valve element 34 and the inner valve element 35 for a given steering effort means a comparatively smaller power assist.

When the vehicle is travelling at low or intermediate speed, the control oil pump 29 is actuated at a corresponding speed, and the pressure acting on the right end of the valve element of the cut-off valve 25 is determined by the balance between the flow rate of the hydraulic oil introduced from the sensor orifice 45 and the flow rate of the hydraulic oil drawn by the oil pump 29. Because the degree of communication of the cut-off valve 25 is determined by the balance between this pressure and the spring force in a continual manner, the magnitude of power assist can be continually varied in dependence on the oil pressure indicative of the vehicle speed and acting on the control piston 18.

Thus, the present invention allows a sufficient assist torque to be produced at low speed without causing any excessive responsiveness at high speed. In particular, a torsion bar having a relatively high rigidity can be used, and the power steering system according to the present invention can give a firm impression to the vehicle operator as he turns the steering wheel at high speed, and can yet provide a sufficient assist torque at low speed.

Although the present invention has been described in terms of a specific embodiment, it is possible to modify and alter details thereof without departing from the spirit of the present invention. For instance, the control piston may be replaced by other actuators such as a combination of an electric motor and a rack and pinion mechanism or a screw mechanism, or an electromagnetic actuator. It is obvious for a person skilled in the art that the gear box for the steering system is not limited to the normal rack and pinion gear box, but may consist of gear boxes of other types. Also, the intervals between the three collars are essential, but it is possible to change the relative positions of the three collars in different ways. For instance, the collar associated with the inner valve element may be moved while the other collars are kept stationary. The arrangement of the three collars can be changed as long as the desired magnification factor in the movement of the valve elements for a given twisting angle of the torsion bar can be achieved.

In the above described embodiment, the oil pressure supplied to the control port 18 was controlled according to the vehicle speed by using the cut-off valve 25, the vehicle speed sensor unit 32, and the sensor orifice 45, but it is also possible to control the oil pressure supplied to the control port 18 by using an electromagnetic valve, and actuate the conversion mechanism 36 according to the steering angle and the steering angular speed. The scope of the invention is indicated by the appended claims rather than by the foregoing description.

What we claimed is:

1. A hydraulic power steering system, comprising:
   a housing;
   an input shaft rotatably supported by said housing and adapted to be connected to a steering wheel for receiving a steering input;
   a pinion rotatably supported by said housing and meshing with a steering rack for actuating steerable road wheels;
   a torsion bar connected between said input shaft and said pinion in a torque transmitting relationship;
   a power cylinder for actuating said steering rack;
   a rotary valve unit adapted to be actuated according to a relative angular displacement between said input shaft and said pinion, said rotary valve unit comprising an annular outer valve element fixedly secured to said pinion coaxially with said torsion bar, and an annular inner valve element adjustably and coaxially received in said outer valve element, the relative angular displacement between said inner and outer valve elements determining the allocation of hydraulic pressure from an oil pump to two pressure chambers of said power cylinder;
   said input shaft, said inner valve element, and said outer valve element being angularly displaceable relative to each other for a given twisting angle of the torsion bar;
   a conversion mechanism engaged to said input shaft, said inner valve element and said outer valve element for determining relative angular displacements thereof for said given twisting angle of said torsion bar; and
   varying means for varying said relative angular displacements of said input shaft, said inner valve element and said outer valve element for said given twisting angle of said torsion bar.

2. A hydraulic power steering system according to claim 1, wherein said conversion mechanism comprises a first member integrally rotatable with said outer valve element and freely slidable along a central axial line of said torsion bar, a second member fixedly secured to said inner valve element, a third member located between said first and second members along an axial direction substantially corresponding to said axial line and fixedly secured to said input shaft, and a lever member pivotally connected to said first, second and third members in such a manner that said first, second and third members are allowed to move circumferentially relative to one another, and said first member is allowed to move along said axial direction relative to said second member, and said varying means comprises an actuator for moving said first member in said axial direction relative to said second member.

3. A hydraulic power steering system according to claim 2, wherein said first, second and third members comprise annular members arranged coaxially around said central axial line.

4. A hydraulic power steering system according to claim 3, wherein said lever member comprises a rod member passed through said first, second and third members via spherical joints.

5. A hydraulic power steering system according to claim 4, wherein said varying means comprises a hydraulic control cylinder for moving said first member along said axial direction.

6. A hydraulic power steering system according to claim 5, further comprising a vehicle speed sensor means for producing a hydraulic pressure corresponding to a vehicle speed, and applying it to said hydraulic control cylinder.

7. A hydraulic power steering system, comprising:
   a housing;
   an input shaft rotatably supported by said housing and adapted to be connected to a steering wheel for receiving a steering input;
   a pinion rotatably supported by said housing and meshing with a steering rack for actuating steerable road wheels;
   a torsion bar connected between said input shaft and said pinion in a torque transmitting relationship;
   a power cylinder for actuating said steering rack;
   rotary valve means for supplying an appropriate hydraulic pressure to said power cylinder corresponding to a direction and a magnitude of the steering input from the steering wheel;
   said rotary valve means being actuated according to a relative angular displacement between said input shaft and said pinion, and said rotary valve means comprises an outer valve element fixedly secured to said pinion coaxially with said torsion bar, and an inner valve element pivotally and coaxially received in said outer valve element, the relative angular displacement between said inner and outer valve elements determining the allocation of a given hydraulic pressure within the rotary valve means from an oil pump to two pressure chambers of said power cylinder; and
   varying means for adjusting said rotary valve means to vary the hydraulic pressure supplied to said power cylinder by said rotary valve means for a given twisting angle of said torsion bar according to an operating condition of a vehicle on which the steering system is installed.

8. A hydraulic power steering system according to claim 7, wherein said rotary valve means further comprises a conversion mechanism engaged to said input shaft, said inner valve element and said outer valve element for determining relative angular displacements thereof for a given twisting angle of said torsion bar; and said varying means is operatively connected to said conversion mechanism and varies said relative angular displacements of said input shaft, said inner valve element and said outer valve element for the given twisting angle of said torsion bar.

9. A hydraulic power steering system according to claim 8, wherein said varying means comprises a hydraulic control cylinder operably connected to said conversion mechanism, such that the relative angular displacements of the input shaft, the inner valve element, and the outer valve element are varied according to the position of a piston of the hydraulic control cylinder.

10. A hydraulic power steering system according to claim 9, further comprising a vehicle sensor means for producing a hydraulic pressure corresponding to a sensed vehicle speed, and applying the hydraulic pressure to said hydraulic control cylinder for varying the position of said piston.

11. A hydraulic power steering system according to claim 7, wherein said varying means is disposed within said rotary valve means.

12. A hydraulic power steering system according to claim 7, wherein said varying means is hydraulically controlled.

* * * * *

UNITED STATES PATENT AND TRADEMARK OFFICE
CERTIFICATE OF CORRECTION

PATENT NO. : 5,593,002
DATED : January 14, 1997
INVENTOR(S) : Okada, et al.

It is certified that error appears in the above-indentified patent and that said Letters Patent is hereby corrected as shown below:

Column 10, line 2, after "vehicle" insert --speed--.

Signed and Sealed this

Twenty-fifth Day of March, 1997

Attest:

BRUCE LEHMAN

*Attesting Officer*      *Commissioner of Patents and Trademarks*